US 7,783,600 B1

(12) United States Patent
Spertus et al.

(10) Patent No.: US 7,783,600 B1
(45) Date of Patent: Aug. 24, 2010

(54) REDUNDANCY MANAGEMENT SERVICE FOR PEER-TO-PEER NETWORKS

(75) Inventors: Michael P. Spertus, Chicago, IL (US); Slava Kritov, Palo Alto, CA (US)

(73) Assignee: Symantec Operating Corporation, Mountain View, CA (US)

( * ) Notice: Subject to any disclaimer, the term of this patent is extended or adjusted under 35 U.S.C. 154(b) by 779 days.

(21) Appl. No.: 11/362,957

(22) Filed: Feb. 27, 2006

(51) Int. Cl.
G06F 17/30 (2006.01)
G06F 11/00 (2006.01)
(52) U.S. Cl. .................. 707/622; 707/610
(58) Field of Classification Search ............. 707/204, 707/622, 610; 714/6
See application file for complete search history.

(56) References Cited

U.S. PATENT DOCUMENTS

| | | | |
|---|---|---|---|
| 6,816,980 B1* | 11/2004 | Fukuhara et al. ............ 714/4 |
| 7,203,871 B2* | 4/2007 | Turner et al. ............. 714/710 |
| 7,209,973 B2* | 4/2007 | Tormasov et al. .......... 709/231 |
| 7,272,746 B2* | 9/2007 | Deerman et al. ............ 714/4 |
| 2001/0042221 A1* | 11/2001 | Moulton et al. ............ 714/5 |
| 2001/0044879 A1* | 11/2001 | Moulton et al. .......... 711/114 |
| 2002/0065962 A1* | 5/2002 | Bakke et al. ............. 710/38 |
| 2003/0115251 A1* | 6/2003 | Fredrickson et al. ....... 709/201 |
| 2004/0184478 A1* | 9/2004 | Donescu et al. .......... 370/462 |
| 2005/0015658 A1* | 1/2005 | Zohar et al. ............. 714/10 |
| 2005/0097165 A1* | 5/2005 | Lahtinen et al. .......... 709/203 |
| 2005/0114296 A1* | 5/2005 | Farber et al. ............. 707/1 |
| 2006/0015586 A1* | 1/2006 | Sharma et al. ........... 709/220 |
| 2007/0109958 A1* | 5/2007 | Fehrmann et al. .......... 370/217 |
| 2007/0133554 A1* | 6/2007 | Ederer et al. ........... 370/395.3 |
| 2007/0143375 A1* | 6/2007 | Tom et al. ............... 707/204 |
| 2007/0174668 A1* | 7/2007 | Srinivasan .............. 714/6 |
| 2007/0185848 A1* | 8/2007 | Farber et al. ............ 707/3 |
| 2007/0208748 A1* | 9/2007 | Li .................... 707/10 |

OTHER PUBLICATIONS

"Erasure Coding vs. Replication: A Quantitative Comparison"; Weatherspoon, et al; Electronic Proceedings for the 1st International Workshop on Peer-to-Peer Systems (IPTPS '02), Mar. 7-8, 2002—MIT Faculty Club, Cambridge, MA, USA.
"Kademlia: A Peer-to-peer Information System Based on the XOR Metric"; Maymounkov, et al; Electronic Proceedings for the 1st International Workshop on Peer-to-Peer Systems (IPTPS '02); Mar. 7-8, 2002—MIT Faculty Club, Cambridge, MA, USA.

* cited by examiner

*Primary Examiner*—John E Breene
*Assistant Examiner*—Joshua Bullock
(74) *Attorney, Agent, or Firm*—Rory D. Rankin; Meyertons Hood Kivlin Kowert & Goetzel, P.C.

(57) ABSTRACT

A system for a redundancy management service for peer-to-peer (P2P) networks includes one or more processors and memory coupled to the processors. The memory stores program instructions executable by the processors to receive a request at a device to upload a data object from the device into a P2P network. In response to receiving the request, the instructions are executable to identify a redundancy manager associated with the device and to transmit the data object to the redundancy manager. In addition, the instructions are executable to upload, from the redundancy manager to one or more target devices of the P2P network, a plurality of data blocks derived from the data object, such that the data object may be recovered from a subset of the plurality of data blocks.

25 Claims, 5 Drawing Sheets

REDUNDANCY MANAGEMENT SERVICE FOR PEER-TO-PEER NETWORKS

BACKGROUND OF THE INVENTION

1. Field of the Invention

This invention relates to computer systems and, more particularly, to storage management in peer-to-peer networks.

2. Description of the Related Art

Today's enterprise environments typically comprise a wide variety of computing devices with varying processing and storage resources, ranging from powerful clusters of multiprocessor servers to desktop systems, laptops, and relatively low-power personal digital assistants, intelligent mobile phones and the like. Most or all of these devices are often linked, at least from time to time, to one or more networks such as the Internet, corporate intranets, departmental or campus local area networks (LANs), home-based LANs, etc. Furthermore, most or all of these devices often store data, at least temporarily, that if lost or corrupted may lead to considerable rework and/or to lost business opportunities. While perhaps not as important from a business perspective, the loss or corruption of personal data such as photographs, financial documents, etc., from home computers and other devices outside corporate boundaries may also have unpleasant consequences. Backing up the data locally, e.g., to devices stored at the same building or site as the source data, is typically not sufficient, especially in the event of catastrophic events such as hurricanes, tornadoes, floods, fires and the like.

While backup to remote sites for disaster recovery has been implemented in various forms over the years, traditional disaster recovery techniques are often centrally controlled and expensive, and are therefore typically limited to protecting the most important, mission-critical subsets of business data. In recent years, in order to take advantage of the widening availability of Internet access and the mass availability of cheap storage, several peer-to-peer (P2P) storage management techniques have been proposed. In such P2P storage management environments, for example, each participating device may be allowed to upload data objects such as files into a P2P network or "cloud" (a large distributed network, such as hundreds or thousands of hosts connected to the Internet). In the event of a failure at the source device (the device from which the data objects were uploaded), the data objects may be retrieved from the P2P cloud. In addition to disaster recovery, P2P storage may also be utilized for a number of additional purposes, including, for example, efficient file sharing. Some or all of the participating devices may also store data uploaded by other peer devices of the P2P cloud. P2P storage management software may be installed at the participating devices to enable devices to find target devices to store uploaded data, to search for previously uploaded data within the P2P cloud, to store incoming P2P data received from peer devices, and to retrieve data from other devices of the P2P cloud as needed. P2P storage management protocols are often decentralized to support scaling to larger and larger networks, so that the responsibility of implementing the protocol does not result in performance bottlenecks at a single participating device or a few participating devices. Often, few restrictions are placed on devices for membership in P2P networks: e.g., even a home personal computer that is only powered on for a few hours a day may be allowed to participate in a P2P network.

As a result of the relatively lax requirements for participation in P2P networks, few guarantees can usually be provided regarding the availability of any given device in the P2P network. If, in a naïve implementation of P2P storage management, an important file was uploaded to only one or two target devices of the P2P network from a source device, it is quite possible that none of the target devices that store the file may be online or available when the file has to be retrieved. Data to be uploaded is therefore typically erasure coded and/or replicated at the source device prior to uploading to several targets in the P2P cloud, so that the probability of being able to recover the source data is increased. (In general, an erasure code transforms a data object containing n blocks into a data object with m blocks, where m is large than n, such that the original data object can be recovered from a subset of those m blocks.) This can, however, often lead to a substantial increase in the total amount of data that has to be transmitted from the source device, as well as a substantial increase in processing. For example, to store one megabyte of "real" data, the total amount of data required to be uploaded into the network may be five or more megabytes, representing an increase of several hundred percent in the bandwidth required for the upload. A corresponding increase in processor and/or memory usage may also be required to derive the expanded version of the data. However, many of the devices participating in P2P storage, such as home computers, laptops etc., often have relatively limited processing capabilities, memory and upload bandwidth, and may not always remain connected for long enough periods to the P2P network to upload the amount of data needed in accordance with the redundancy requirements of P2P storage management. Such resource limitations may thus become a significant hurdle preventing large-scale implementations of traditional P2P storage management techniques.

SUMMARY

Various embodiments of systems and methods for a redundancy management service for peer-to-peer (P2P) networks are disclosed. According to one embodiment, a system includes one or more processors and memory coupled to the processors. The memory stores program instructions executable by the processors to receive a request at a device to upload a data object from the device into a P2P network. In response to receiving the request, the instructions are executable to identify a redundancy manager associated with the device and to transmit the data object to the redundancy manager. In addition, the instructions are executable to upload, from the redundancy manager to one or more target devices of the P2P network, a plurality of data blocks derived from the data object, such that the data object may be recovered from a subset of the plurality of data blocks. The data blocks derived from the data object may, for example, comprise an encoded version of the data object obtained by executing a specific erasure coding algorithm whose parameters may be selected by the redundancy manager or specified by the client. In alternative embodiments, the redundancy manager may be configured to generate one or more full replicas of the data object for dissemination into the P2P network. By offloading much of the redundancy-related processing and bandwidth requirements to the redundancy manager, the system may significantly reduce the client-side overhead of P2P storage.

In one embodiment, at least a portion of the functionality of the redundancy manager may be implemented a web service. In one implementation, for example, one or more J2EE™ application servers may be configured to execute a redundancy management web service. Interfaces provided by the web service may be accessed by users to select the data objects to be uploaded, and/or to specify a desired level of service for the uploads. In one specific embodiment, users may select whether a particular upload is to utilize an external redundancy manager or not.

In some embodiments, devices of the P2P network may be set up in advance to serve as redundancy managers. In other embodiments, devices may be dynamically selected to perform redundancy management functions for a given upload request, e.g., based on any of a variety of factors such as their current utilization levels, available bandwidth, etc. In some embodiments, devices already fulfilling specific networking functionality, such as firewalls, gateways, or routers may be selected as redundancy managers.

In one embodiment, a system includes one or more client devices and one or more redundancy managers linked to the client devices and to a P2P network. In response to a request to upload a data object into the P2P network, a client device is configured to identify a particular redundancy manager to process the request, and transmit the data object to the particular redundancy manager. The particular redundancy manager is configured to receive the data object, generate a plurality of data blocks derived from the data object, wherein the data object is recoverable from a subset of the plurality of data blocks, and upload the plurality of data blocks to one or more target devices of the P2P network.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
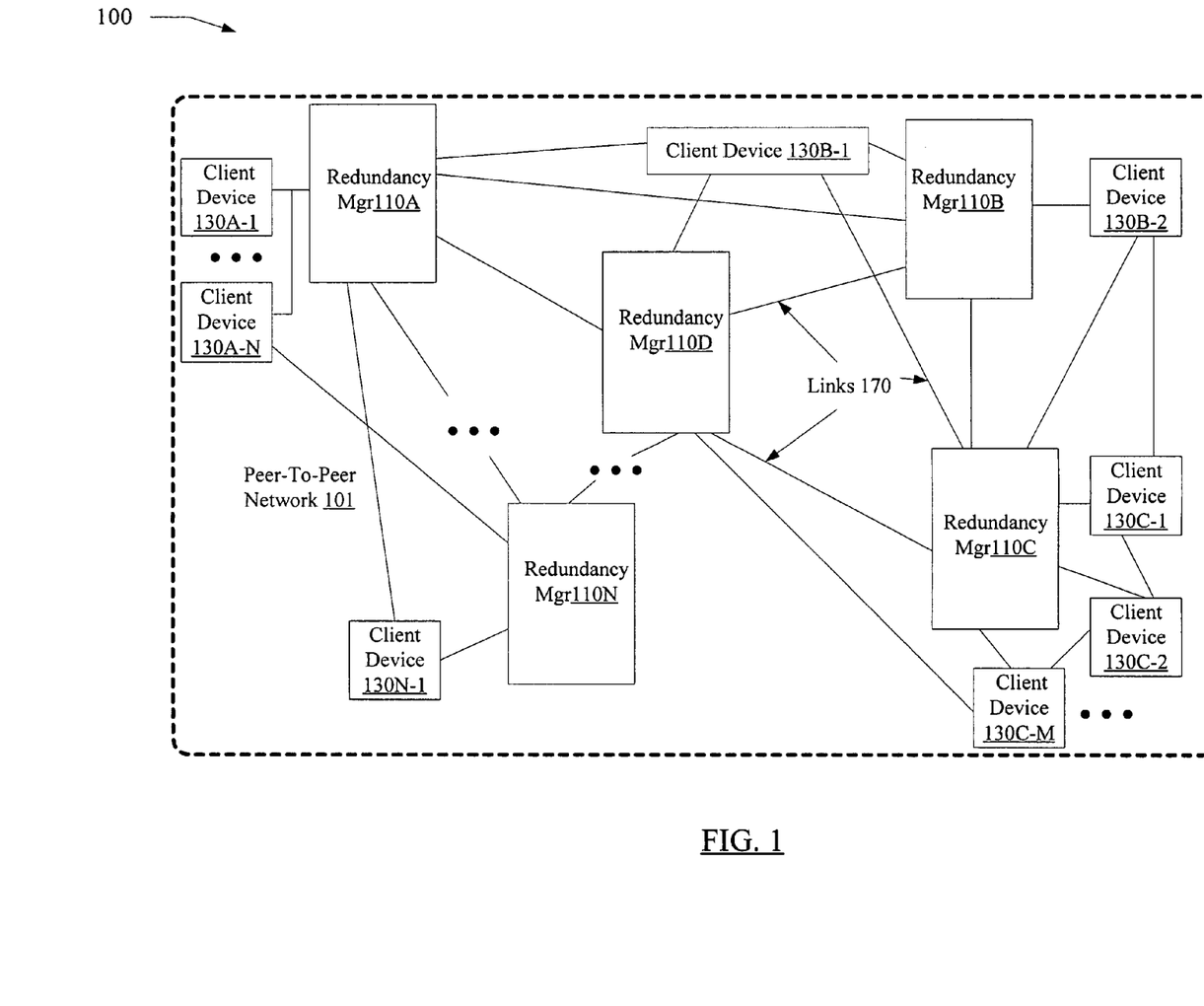
FIG. 1 is a block diagram illustrating one embodiment of a system.

FIG. 1 is a block diagram illustrating a system 100 according to one embodiment. As shown, system 100 includes a plurality of client devices 130 (e.g., devices 130A-1-130A-N, 130B-1, 130C-1-130C-M, 130N-1) and a plurality of redundancy managers 110 (e.g., redundancy managers 110A-110N). At any given point of time, at least some of the redundancy managers 110 and at least some of the client devices 130 may be linked to one another via links such as links 170 of network 101 in a peer-to-peer (P2P) configuration to implement a distributed storage management technique in which the redundancy managers are configured to offload some of the processing typically required to be performed by clients 130 when data objects are uploaded into the P2P network 101, as described below in further detail. For example, in one embodiment, in response to a request at a client device 130 to upload a specified data object into the P2P cloud, a particular redundancy manager 110 associated with the client device 130 may be identified. The data object may be transmitted from the client device 130 to the identified redundancy manager 110. The redundancy manager 110 may be configured to derive from the data object a plurality of data blocks from which the object may be recovered even if some of the data blocks are lost (e.g., an erasure coded version of the data object, or one or more full replicas of the data object). The plurality of data blocks derived from the data object may be referred to herein as comprising a "redundant version" of the data object. The redundancy manager may then be configured to upload the derived data blocks to selected target devices of the P2P network 101. In this way, the overhead of participating in P2P storage may be reduced for client devices 130, at least some of which may have limited upload bandwidth capabilities and/or less powerful processing resources than corresponding redundancy managers 110. A client device may not even have to remain connected to the P2P network while the redundant version is uploaded into the network from the redundancy manager in some embodiments.

The set of devices in the P2P network (such as redundancy managers 110 and client devices 130) may collectively be termed "peer devices" or "P2P devices" herein, and the peer devices together with their connecting links 170 may be termed a "P2P cloud" herein. Client devices 130 may also be referred to herein simply as "clients". The devices 110 and 130 may typically be spread over a large number, such as hundreds or thousands, of physical locations; for example, the P2P cloud may in one embodiment comprise portions of the Internet, allowing relatively autonomous devices geographically distributed across several continents to collaborate as desired on one or more activities, such as distributed backup, file sharing, distributed computation initiatives (e.g., the Search for Extra-Terrestrial Intelligence (SETI) project), etc. In other embodiments, P2P collaboration on a particular type of function or service may be limited to, for example, computer systems owned and managed by a single corporation, and only devices that can establish their identity in accordance with a particular authentication mechanism implemented by the corporation may be allowed to participate in P2P activities. A given client device 130 may serve in some embodiments both as a source from which data objects are uploaded into the P2P network and as a target into which data objects uploaded from other devices are stored.

In one embodiment, each physical site of the P2P cloud participating in distributed storage management may include at least one redundancy manager 110; for example, a particular device such as a computer server or a network-attached storage (NAS) device at a given site may be selected or set up as a redundancy manager 110 based on properties such as high availability, reliable connectivity to the P2P network over a high-bandwidth connection, processing power and/or storage capacity, etc. For example, a particular server may qualify as a redundancy manager if it is known to have been offline for no more than an hour during the past year, and if it is known to be connected to the Internet via at least a 1.544 Megabits/second T1 connection when it is online. Each client device 130 may be capable of connecting at least temporarily to a redundancy manager 110 at the site at which the client device is currently located, e.g., via a Local Area Network (LAN), allowing relatively fast and reliable data communications between the clients and the redundancy managers at a given site in such embodiments. In FIG. 1, for example, client devices 130A-1-130A-N may be linked to redundancy manager 110A at a local site, client device 130B-1 may be linked locally to redundancy managers 110B and 110D, client devices 130C-1-130C-M may be located at the same site as redundancy manager 110C, and so on. Redundancy managers 110 as well as client devices 130 may include respective components or modules of P2P storage management software. In some embodiments, e.g., to simplify deployment, the same modules (i.e., software capable of performing both client functionality and redundancy manager functionality) may be installed at all peer devices participating in the P2P storage management technique. It is noted that a redundancy manager 120 may be incorporated in some embodiments within a firewall device, a gateway, a router, or within another device configured to implement security and/or routing-related services.

In other embodiments, at least some sites of the P2P cloud may not include a redundancy manager 110 at the point in time when a client device requests an upload of a data object into the P2P cloud. In such embodiments, any of several different approaches may be used in response to the upload request. For example, in one embodiment, P2P storage management software may dynamically appoint a particular local device (i.e., a device at the same site as the requesting client) as a redundancy manager 110 if the particular device meets specified requirements. The requirements may include desired processing power (e.g., CPU speed, number of CPUs, etc.), memory size, availability, connectivity, etc. The dynamic appointment or selection of a device as a redundancy manager 110 may be short-lived in some embodiments (e.g., the selected device may serve as a redundancy manager for a specified time or a specified number of upload requests), and more long-lived or even permanent in other embodiments.

In one embodiment, if no local redundancy manager is found, the P2P storage management software may be configured to perform a search for a non-local device currently configured as a redundancy manager 110, e.g., based on specified criteria such as a desired upper limit for a round-trip message delay between the requesting client and the non-local device. If the search results in an appropriate redundancy manager being found, that redundancy manager may be used for the requested upload; otherwise, the requesting client device 130 may have to generate the redundant version of its data object for uploading, or may be configured to wait until a redundancy manager becomes available. In other embodiments, if a local redundancy manager is not available, no search may be performed; instead, the requesting client may be configured to decide whether to delay the upload to a later time or to generate the redundant version of the data and upload the data directly into the P2P cloud without utilizing an external redundancy manager.

A number of different techniques may be used to generate the redundant version of the data object in different embodiments. In general, as noted above, the redundant version of the source data object may comprise a plurality of data blocks, such that the data object is recoverable from a subset of the data blocks. In one embodiment, for example, the data object may simply be replicated for redundancy: e.g., c copies of the data object may be generated by the redundancy manager 110, and one copy may be stored in each of c locations in the P2P cloud (such as other redundancy managers 110 and/or other client devices 130). As long as any one of the c copies remains accessible, the data object is recoverable. In other embodiments, instead of employing full redundancy, the data object may be erasure coded instead: e.g., in one scenario, an erasure coding algorithm may be executed to subdivide the data object into n data blocks and then to generate m data blocks from the original n data blocks (where m>n), such that the data object can be reconstructed from a subset comprising (m-k) of the generated blocks, even if up to k of the data blocks are lost or inaccessible. The ratio (n/m) for a given erasure coding algorithm may be called the "rate" of encoding. In some implementations, so-called "optimal" erasure codes may be used, in which any n of the m data blocks may be sufficient to restore the original data object. For example, with a rate of (1/5), a file comprising 16 four-kilobyte pages may be optimally erasure coded into 80 four-kilobyte pages, such that the file may be reconstructed from any 16 of the pages, even if the remaining 64 pages are lost. It is noted that, strictly speaking, full replication may also be considered an example of optimal erasure coding: e.g., a generation of four full replicas corresponds to an erasure encoding with r=(1/4), n=1 and m=4. Various redundancy techniques used in RAID (Redundant Array of Inexpensive Disks) devices may also be considered examples of optimal erasure coding: e.g., RAID-1 (also known as mirroring) corresponds to erasure coding parameters (n=1,m=2), and RAID-5 corresponds to erasure coding parameters (n=4,m=5). In other embodiments, for example to reduce the costs of optimal erasure coding, so-called near-optimal erasure codes may be used, in which $(1+\epsilon)*n$ blocks may be needed to recover the original n blocks. The factor "$\epsilon$" may be reduced by using additional computational resources in some implementations, depending on the specific erasure coding algorithm being used, thus trading off processing resources for storage resources. Error-correcting encodings other than erasure coding and replication may be used in some embodiments. Various parameters (such as c, m, n, and E described above, as well as identifications of specific erasure coding algorithms and/or full replication levels) that may be used to generate the redundant version of a data object may be termed "redundancy parameters" herein.

A particular redundancy manager 110 that is responsible for generating the redundant versions of uploaded objects for a given client device 130 may be termed the "designated" or "controlling" redundancy manager for the given client device 130. In some embodiments, the designated redundancy manager for a given client device may change over time: e.g., each time that the client device 130 requests an upload, a redundancy manager for that request may be selected, and different devices may at least in principle be selected to perform the redundancy manager role for different upload requests. In other embodiments, each client device 130 may be allotted a particular redundancy manager device 110, and the same redundancy manager 110 may be used (as long as it remains operational) for all the uploads originating from a given client device 130. In some embodiments, in addition to being responsible for generating and uploading the redundant versions of a client's data, a designated redundancy manager 110 may also be responsible for one or more additional functions related to the management of the client's data in the P2P cloud. For example, the designated redundancy manager 110 may be configured to check that enough replicas or erasure coded versions of the client's data remain in the P2P cloud so that the data can be recovered in the event of a specified number of failures of peer devices, to add additional replicas or erasure coded versions of client data objects to the P2P cloud if needed, to delete previously uploaded redundant versions of data objects from the cloud, and/or to reassemble client data from previously uploaded redundant versions for restore, based on various P2P storage management algorithms and policies. The check to determine that enough redundant versions of a data object remain may be termed a check for a desired "redundancy level" of the data object.

Any desired erasure coding or full replication technique, or a combination of one or more erasure coding and replication techniques, may be employed by a redundancy manager 110 in response to a given request to upload a data object from a client 130 into the P2P cloud. In some embodiments, selecting the specific encoding technique used and/or the redundancy parameters may be the responsibility of the redundancy manager 110. For example, the designated redundancy manager 110 for a given client 130 may be configured to determine, for a given data object, whether full replication is required or whether a specific erasure coding algorithm that does not require full replication is to be used. The designated redundancy manager may be configured to use its knowledge of the current state of various devices in the P2P cloud in making the determination in some embodiments. E.g., if a plurality of highly available devices (such as other redundancy managers) are willing to store portions of the redundant version of the data object, the level of redundancy used may be relatively low; and if target devices of unknown or low availability have to be used to store the client's data, a relatively large number of target devices may be used. In some embodiments, a single technique may be used by a given redundancy manager 110 to generate redundant versions of a plurality of data objects received from a plurality of clients, e.g., the technique may be specified during initial configuration or initialization of the redundancy manager. In other embodiments, the specific technique used may be dependent on the requesting client 130. E.g., the client 130 may indicate desired redundancy parameters on a per-request basis, or may select a desired level of service for uploading selected data objects, as described below in further detail in conjunction with the description of FIG. 2. In one embodiment, a client 130 may specify desired redundancy characteristics for a plurality of data objects in a single configuration message to the redundancy manager 110: e.g., such a message may inform the redundancy manager that the specified redundancy parameters (choice of algorithm and parameters, etc.) are to be used for all objects uploaded from the client 130 until further notice.

In some embodiments, at least a part of the functionality of the redundancy manager may be implemented as a web service. For example, a portion or all of the redundancy manager functionality may be implemented within one or more J2EE™ (Java 2, Enterprise Edition) or .NET™ application servers, and may be accessible via interfaces specified using WSDL (Web Services Definition Language) or any desired web services specification. A web-based user interface may be provided in some embodiments, such as a clickable button on a web page, allowing users to specify the data objects to be uploaded, and the user interface may invoke one or more interfaces of the web service provided by the application server or application servers. The data objects to be uploaded into the P2P network from the client device 130 may be identified either directly by the users or by applications (such as backup applications, disaster recovery applications, etc.) in various embodiments. Data objects for upload may be specified at any desired granularity in various embodiments: e.g., a user may specify a single file or a directory to be uploaded, a backup application may specify a file system for a full or incremental backup, etc. In some embodiments, instead of specifying the data objects by name, attributes of data objects may be specified (e.g., a user may generate a request to upload "all files in "My Documents" folder updated after 10:00 am yesterday") and the P2P storage management software may use the attributes to identify the specific objects to be uploaded.

In one embodiment, at least some of the operations of the redundancy manager 110 (e.g., the generation of the redundant version and/or the transmission of the redundant version into the P2P network) may be performed asynchronously with respect to the request from the client device 130. For example, after a client 130 requests a P2P upload of a specified data object, the client may be provided a success indication as soon as the data object has been received at the redundancy manager 110. On receiving the success indication, the client may proceed to perform other tasks. Meanwhile, asynchronously with respect to the client's request, the redundancy manager 110 may prepare the redundant version of the data object and transmit it into the P2P cloud. In some embodiments, e.g., when the specified data objects are relatively large and/or the bandwidth available to transfer the data from the client to the redundancy manager is relatively limited, the generation and/or transmission of the redundant version may begin even before the complete non-redundant version has been received at the redundancy manager. For example, if the data object specified in the upload request is several tens of megabytes long, the redundancy manager may be capable of generating a redundant version of the blocks of the data object that are received earliest, and/or transmitting the redundant version, before the entire data object has been received from the client. In some implementations, multiple threads of execution at the redundancy manager may be configured to generate and/or transmit the redundant versions of the data objects from one or more clients in parallel. It is noted that a client device 130 may encrypt a data object before transmitting it to a redundancy manager in some embodiments, e.g., if the network link between the client and the redundancy manager is insecure and/or or if the redundancy manager 110 is not trusted with the client's unencrypted data. In other embodiments, a client 130 may send an unencrypted version of the data object to the redundancy manager 110, and the redundancy manager 110 may be configured to encrypt it, e.g., before generating the redundant version and uploading the redundant version into the P2P cloud.

In some implementations, as noted above, redundancy managers 110 may be selected from among highly available and highly connected pre-existing devices of the P2P network, while in other implementations highly available dedicated devices (such as NAS appliances or computer servers) may be added to the P2P network specifically to serve as redundancy managers. In some embodiments, the redundancy managers 110 may be used as targets for storing the redundant versions of client data; in other embodiments, the redundancy managers may serve only as staging devices that generate and transfer redundant versions of client data, without actually storing the redundant versions locally to support access by other devices of the P2P network. In embodiments where the redundancy managers 110 are used to persistently store redundant versions of client data, the overall availability of the redundancy managers may be high enough that the level of redundancy required for storing the client data may be reduced: e.g., fewer copies of a given data block may have to stored in the P2P network, since the redundancy managers at which the data block is replicated may have a substantially higher availability than the average availability of devices in the P2P cloud as a whole.

Figure 2:
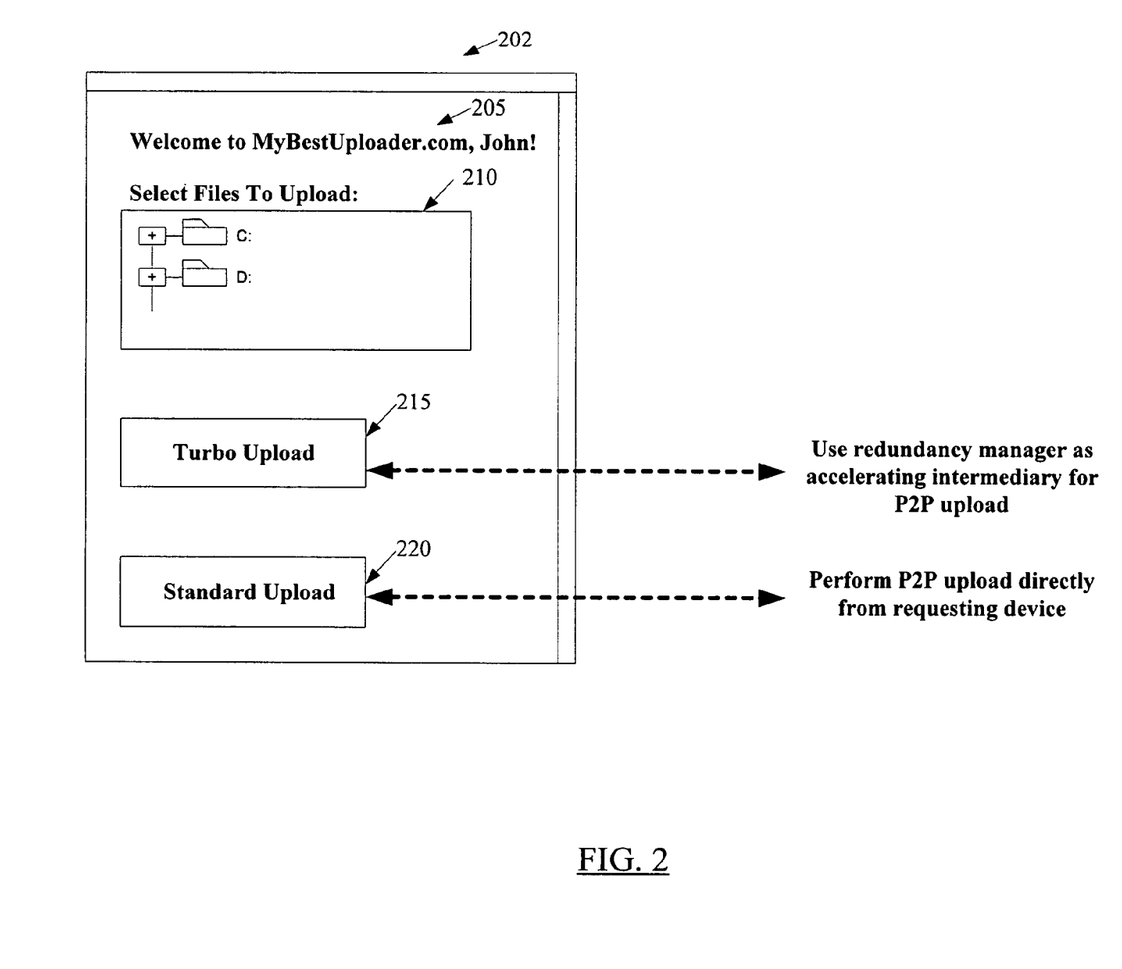
FIG. 2 is a block diagram illustrating an exemplary user interface that may be used at a client device to initiate an uploading of selected files into a P2P network, according to one embodiment.

FIG. 2 is a block diagram illustrating an exemplary user interface that may be used at a client device to initiate an uploading of selected files into the P2P network 101, according to one embodiment. The exemplary user interface comprises a web page 202, including a personalized greeting 205, a section 210 for specifying files to upload, as well as interfaces 215 and 220 to select from among a plurality of service levels for the upload. The user may select files for upload using section 210, e.g., by navigating to the desired directory or directories containing the files. A "Turbo Upload" option may then be selected using button 215, or a "Standard Upload" option may be selected using button 220. If the user selects "Turbo Upload", a redundancy manager may be identified to act as an accelerating intermediary, e.g., an intermediary that is responsible for receiving a non-redundant version of the specified files, generating redundant versions of the files and uploading the redundant versions into selected target devices of the P2P network as described above. If the user selects "Standard Upload", the redundant version of the specified files may be generated at the client device 130 where the request is made and/or where the selected files reside, and may be uploaded directly into the P2P network from the client device. In some implementations, the user may be charged or billed at different rates for "Turbo Uploads" than for "Standard Uploads" of the same selected files—e.g., the user may have to pay more for utilizing the services of the redundancy manager than if the entire overhead for the P2P upload is borne by the client device 130. As noted earlier, in some embodiments, the redundancy manager may be implemented using a web service. In such embodiments, when the use selects the "Turbo Upload" option on web page 202, one or more interfaces exported by the web service may be invoked to complete the upload.

It is noted that various other types of interfaces may be used to specify whether or not a redundancy manager 110 is to be used for uploading a given set of data objects in different embodiments. For example, a graphical user interface with a different set of components than those depicted in FIG. 2 may be used, or a command line interface may be used. In some embodiments, instead of or in addition to interfaces that may require user interaction, programmatic interfaces may be supported, allowing application programs (such as backup applications) and/or scripts to specify both the set of objects to be uploaded and the desired level of service (e.g., whether a redundancy manager is to be used if one is available). More than two service level choices may be provided in some embodiments: e.g., allowing the user to select from among several different priority levels in addition to allowing the user to decide whether a redundancy manager 110 is to be used or not.

Figure 3:
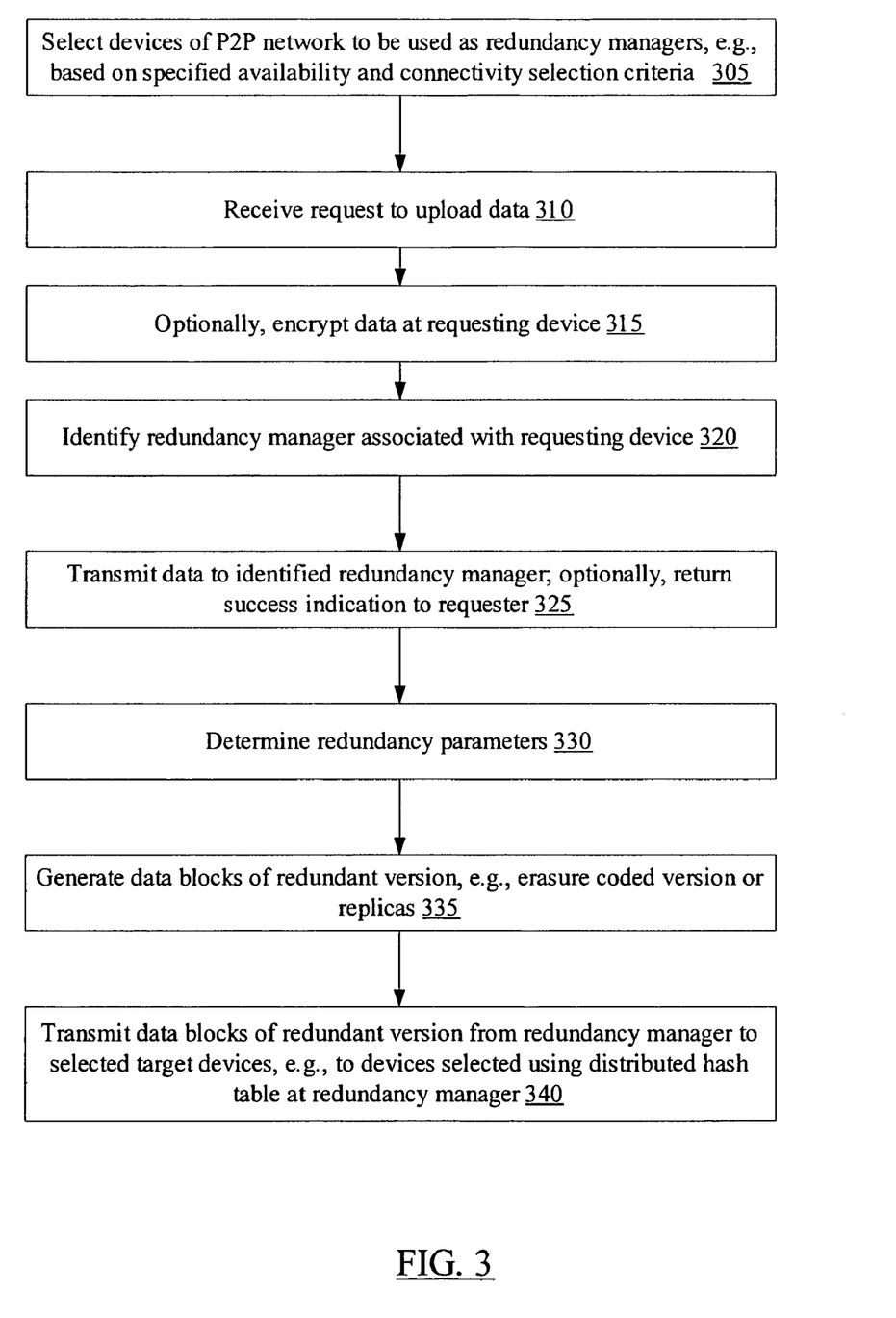
FIG. 3 is a block diagram illustrating aspects of the operation of a P2P storage management technique, according to one embodiment.

FIG. 3 is a flow diagram illustrating aspects of the operation of the P2P storage management technique described above, according to one embodiment. In the depicted embodiment, a number of devices of the P2P network may be selected or designated to serve as redundancy managers (block 305), e.g., with one or more redundancy managers selected for each physical site. A particular device may be selected as a redundancy manager in one embodiment if it has a sufficiently high availability and/or sufficiently reliable connectivity to the P2P network. Threshold levels of availability and/or connectivity for qualifying a given device as a redundancy manager may be specified (e.g., via input parameters to the P2P storage management software) in some embodiments, while in other embodiments, the most highly available devices at a given site (and/or the devices with the highest level of connectivity to the P2P network) may be selected as redundancy managers without using threshold-based qualification criteria.

A request to upload a data object into the P2P cloud may be received at a client device 130 (block 310). The data object may optionally be encrypted at the client device (block 315) in some embodiments. A redundancy manager 110 associated with the client device may then be identified (block 320), and the data object may then be transmitted to the identified redundancy manager (block 325). In some implementations, an identification of one or more redundancy managers 110 that may be used may be stored at the client device 130, and the client device may transmit the data object to any of the one or more redundancy managers. In other implementations, the redundancy manager 110 to be used for a particular upload request may be identified dynamically as described earlier, e.g., based on current network conditions, current load at accessible redundancy managers, and/or various other factors. Load balancing schemes may be implemented in some embodiments where multiple redundancy managers are accessible from the same client device 130: In the configuration illustrated shown in FIG. 1, for example, client device 130B-1 may have direct access to redundancy managers 110A, 110B, 110C as well as 110D, and successive upload requests from client device 130B-1 may be distributed among the four redundancy managers so that no single redundancy manager has to handle all of the upload requests from the client. Any desired load balancing technique may be employed, such as a round-robin technique, a hash-based technique in which a particular redundancy manager is selected based on the name or content of the data object to be uploaded, a random selection technique, etc.

As noted above, a success indication may be sent to the client device as soon as the data object is received at the selected redundancy manager in some embodiments, and the tasks of generating the redundant version and uploading the redundant version may be performed asynchronously with respect to the client request. In the depicted embodiment, the redundancy manager 110 that receives the data object from the client 130 may be configured to determine the redundancy parameters to be used for the data object (block 330 of FIG. 3), such as whether a particular erasure coding algorithm is to be used or whether full replication is to be performed, what the erasure coding parameters are to be if erasure coding is to be used, how many replicas are to be created if full replication is to be performed, which target devices are to be used, etc. In some embodiments, a distributed hash table may be used to implement the P2P storage management technique, e.g., to identify which P2P nodes should be used to store a given data block or data object. In one such embodiment, a portion or all of the distributed hash table may be cached at each redundancy manager, allowing the redundancy manager to more efficiently identify target peer devices to which the data object should be uploaded.

The redundancy manager 110 may then generate the redundant version of the data object (e.g., an erasure coded version or one or more full replicas) according to the selected algorithm and parameters (block 335), and transmit the data blocks of the redundant version to selected target devices in the P2P network (block 340). The target devices may also be selected based on specified criteria in some embodiments, such as physical location (to provide effective disaster recovery by geographically distributing the data blocks of the redundant version), availability, etc. As noted earlier, in some embodiments, the redundancy manager may be configured with multiple threads of execution (e.g., multiple threads of a single process, or multiple cooperating processes), and the tasks of generating the redundant version and/or transmitting the redundant version may be performed in parallel by a plurality of the multiple threads. In some embodiments, slightly different variants of some or all of the operations illustrated in FIG. 3 may be performed; for example, instead of encrypting the data at the client device 130, in some embodiments the redundancy manager may perform the encryption. In some embodiments, e.g., if the P2P network is part of a secure trusted network, encryption may not be performed at all.

Figure 4:
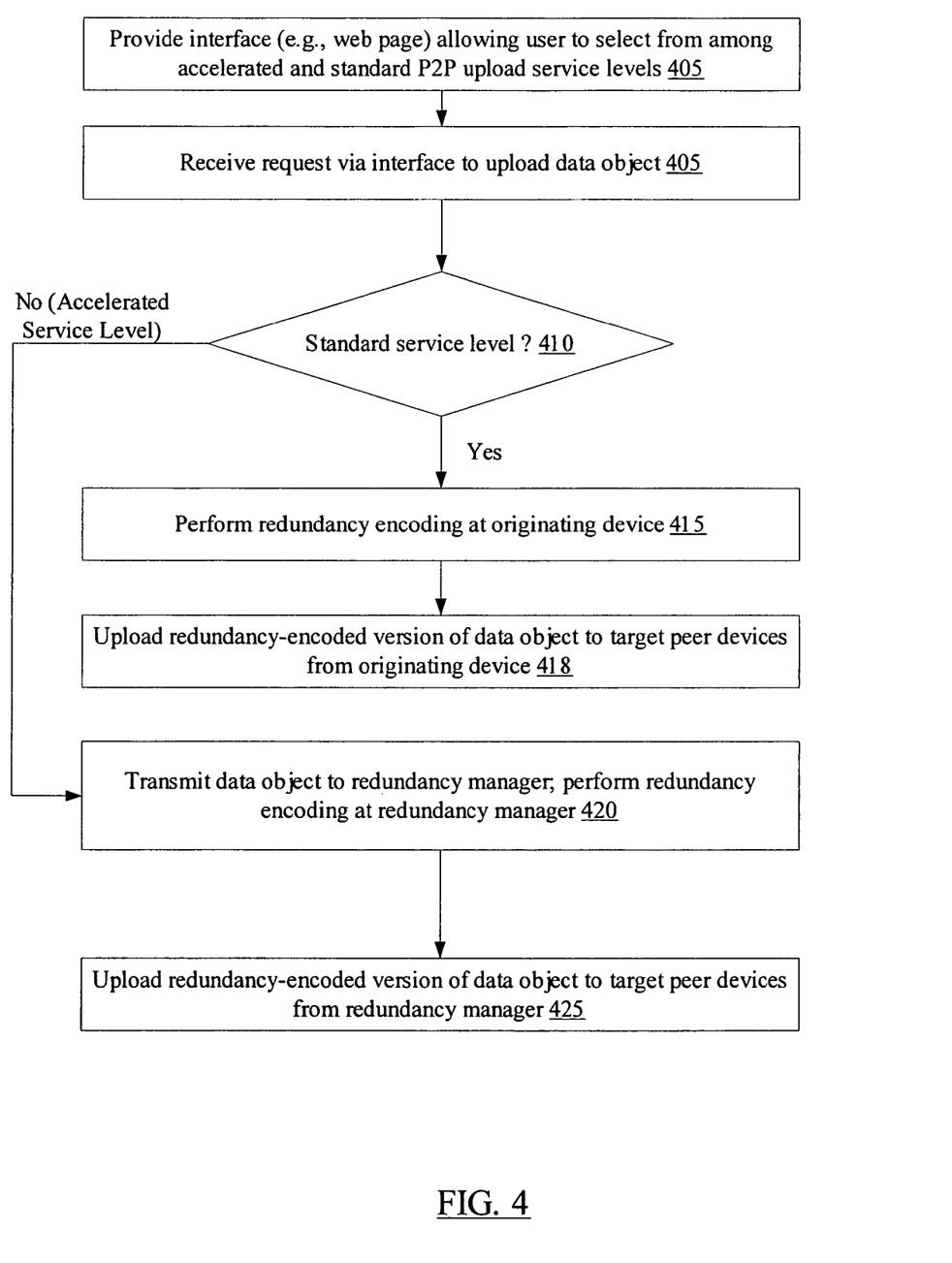
FIG. 4 is a flow diagram illustrating aspects of the operation of a P2P storage management technique according to one embodiment in which users are allowed to select a service level for uploading data objects.

FIG. 4 is a flow diagram illustrating aspects of the operation of the P2P storage management technique according to one embodiment in which users are allowed to select a service level for uploading data objects. As shown in block 405 of FIG. 4, an interface (such as the web page shown in FIG. 2) giving the user a choice of an "accelerated" service level versus a "standard" service level may be provided. The P2P storage management system may then receive a request from the user via the interface specifying one or more data objects to be uploaded (block 410). If the user selects a standard service level (as determined in block 410), redundancy encoding (e.g., using an erasure coding scheme as described above) of the data objects may be performed from the client device where the data objects are originally located (block 415). In embodiments where full replication is performed for redundancy, the originating client device may be responsible for generating and/or uploading the replicated versions of the data objects if the standard service level is chosen. Data blocks corresponding to the redundant version may be uploaded from the originating client device 130 if the standard service level is selected (block 418).

If the user selects the accelerated service level (as also determined in block 410), the data objects may be transferred in non-redundant form from the client 130 to a redundancy manager 110 identified for the upload request (block 420), and the redundancy encoding and/or replica generation may be performed by the redundancy manager. Data blocks corresponding to the redundant version of the data objects may then be transmitted to target devices of the P2P network from the redundancy manager 110 (block 425). In some embodiments, the data objects may be encrypted at the client device 130 prior to transmission to the redundancy manager 110.

Figure 5:
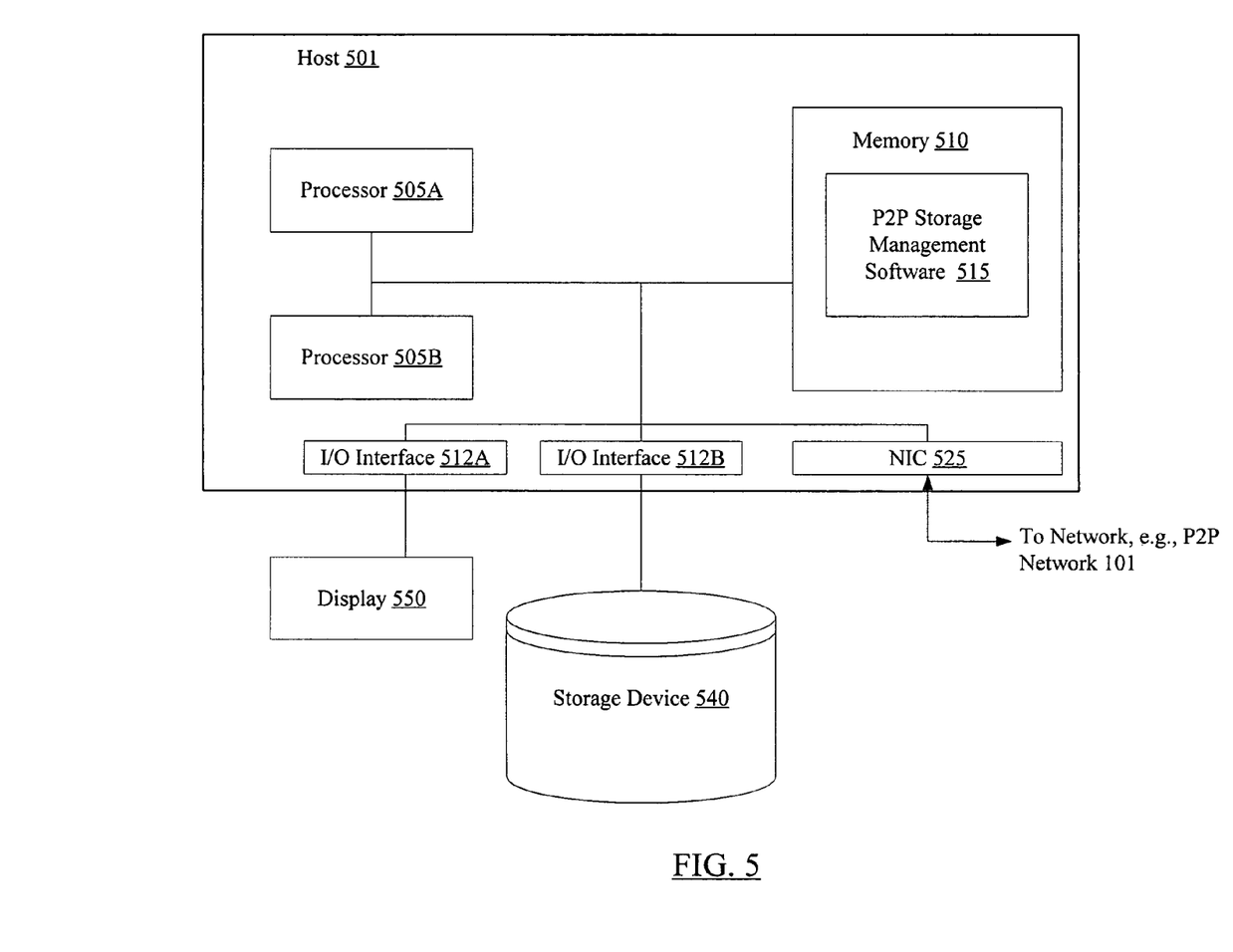
FIG. 5 is a block diagram of a computer host that may function as a redundancy manager and/or a client device, according to one embodiment.

FIG. 5 is a block diagram of a computer host 501 that may function as a redundancy manager 110 and/or a client device 130, according to one embodiment. As shown, host 501 may include one or more processors 505, such as processors 505A and 505B. In various embodiments, processors 505 may be implemented using any desired architecture or chip set, such as the SPARC™ architecture from Sun Microsystems or the x86-compatible architectures from Intel Corporation, Advanced Micro Devices, etc. P2P storage management software 515 comprising program instructions that may be executable to implement the backup techniques described above may be partly or fully resident within a memory 510 at a given point in time, and may also be stored on a storage device 540. Memory 510 may be implemented using any appropriate medium such as any of various types of RAM (e.g., DRAM, SDRAM, RDRAM, SRAM, etc.). In addition to processors 505 and memory 510, host 501 may also include one or more I/O interfaces 512, such as I/O interface 512A to a display device 550, and I/O interface 512B providing access to storage devices 540, one or more network interface cards (NICs) 525 providing access to a network such as P2P network 101, and the like. Any of a variety of storage devices 540 may be used to store the instructions as well as data for backup software 515 in different embodiments, including any desired type of persistent and/or volatile storage devices, such as individual disks, disk arrays, tape devices, optical devices such as CD-ROMs, CD-RW drives, DVD-ROMs, DVD-RW drives, flash memory devices, various types of RAM and the like. One or more storage devices 540 may be directly coupled to host 501 in some embodiments (e.g., using the Small Computer Systems Interface (SCSI) protocol), or may be accessible over any desired storage interconnect such as iSCSI (internet SCSI), a fiber channel fabric or storage area network (SAN) in other embodiments. A storage device 540 may include holographic media in some embodiments.

In addition to P2P storage management software 515, memory 510 and/or storage devices 540 may also store operating systems software and/or software for various applications in various embodiments. In some embodiments, P2P storage management software 515 may be included within an operating system, a backup management software product or another software package, while in other embodiments, P2P storage management software 715 may be packaged as a standalone product. In some embodiments, the component modules of P2P storage management software 715 may be distributed across multiple participating hosts 501 serving as redundancy managers 110 and clients 130, or may be replicated at the participating hosts. In one embodiment, part or all of the functionality of a redundancy manager 110 or a client device 130 may be implemented via one or more hardware devices (e.g., via one or more Field Programmable Gate Array (FPGA) devices) or in firmware. It is noted that a redundancy manager 110 may be incorporated in some embodiments within a network-attached storage (NAS) device, and in other embodiments within a firewall device, a gateway, a router, or within another device configured to implement network security and/or routing-related services. Network 101 and/or the links between client devices 130 and redundancy managers 120 may be implemented using any of a variety of hardware and software networking technologies in various embodiments, such as TCP/IP (Transmission Control Protocol/Internet Protocol) over Ethernet, Asynchronous Transfer Mode (ATM), Fiber Distributed Data Interface (FDDI), etc. Network 101 may include one or more wired or wireless LANs, MANs (Metropolitan Area Networks), and/or WANs (Wide Area Networks) in some embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
    a plurality of client devices; and
    a plurality of redundancy manager devices;
    wherein the plurality of client devices includes a first client device configured to:
    receive a first request to upload a data object into a peer-to-peer (P2P) network;
    in response to the first request, identify a particular redundancy manager device of the plurality of redundancy manager devices as a redundancy manager device designated to upload data objects into the P2P network on behalf of the first client device; and
    in response to identifying the particular redundancy manager device, transmit the data object to the particular redundancy manager device in a second request to upload the data object into the P2P network;
    wherein the particular redundancy manager device is configured to:
    in response to receiving from the first client device the second request to upload the data object into the P2P network, derive a plurality of data blocks from the data object, wherein the data object is recoverable from a subset of the plurality of data blocks; and
    upload the plurality of data blocks to one or more target devices of the P2P network on behalf of the first client device, wherein the one or more target devices include at least one device selected from the plurality of client devices and the plurality of redundancy manager devices.

2. The system of claim 1, wherein the first client device is further configured to:
   display a user interface enabling a user to select a service level from a set of two or more service levels for uploading data objects into the P2P network, including a first service level in which redundancy encoding for data objects is performed at a redundancy manager device, and a second service level in which redundancy encoding for data objects is performed at the first client device;
   wherein the first client device is configured to identify the particular redundancy manager device and request the particular redundancy manager device to upload the data object into the P2P network in response to receiving user input selecting the first service level from the set of two or more service levels.

3. The system of claim 2,
   wherein the data object is a first data object;
   wherein the first client device is further configured to:
   receive an additional request to upload a second data object into the P2P network;
   in response to receiving user input selecting the second service level from the set of two or more service levels, derive a plurality of data blocks from the second data object and upload the plurality of data blocks derived from the second data object to one or more target devices of the P2P network.

4. The system of claim 1,
   wherein the first client device is further configured to transmit to the particular redundancy manager device one or more redundancy parameters to be used by the particular redundancy manager device in deriving the plurality of data blocks from the data object;
   wherein the particular redundancy manager device is configured to use the one or more redundancy parameters in deriving the plurality of data blocks from the data object.

5. The system of claim 1,
   wherein the particular redundancy manager device is further configured to return to the first client device a notification that the second request to upload the data object into the P2P network was successful after receiving the data object from the first client device but before uploading the plurality of data blocks to the one or more target devices of the P2P network.

6. The system of claim 1,
   wherein the particular redundancy manager device is configured to upload the plurality of data blocks to the one or more target devices of the P2P network asynchronously with respect to the second request received from the first client device.

7. The system of claim 1,
   wherein the particular redundancy manager device is configured to derive the plurality of data blocks from the data object asynchronously with respect to the second request received from the first client device.

8. The system of claim 1,
   wherein the particular redundancy manager device is configured to begin deriving the plurality of data blocks from the data object before the entire data object has been received by the particular redundancy manager device.

9. The system of claim 1, wherein the first client device is further configured to:
   prior to receiving the first request to upload the data object, store information specifying the particular redundancy manager device as a redundancy manager device designated to upload data objects into the P2P network on behalf of the first client device;
   wherein identifying the particular redundancy manager device comprises determining that the stored information specifies the particular redundancy manager device.

10. The system of claim 1,
    wherein identifying the particular redundancy manager device comprises dynamically selecting the particular redundancy manager device from the plurality of redundancy manager devices based on current availability of one or more resources of the particular redundancy manager device.

11. The system of claim 1,
    wherein the plurality of data blocks comprise an erasure-encoded version of the data object.

12. The system of claim 1,
    wherein the plurality of data blocks include a plurality of complete copies of the data object.

13. The system of claim 1, wherein the particular redundancy manager device is further configured to:
    after uploading the plurality of data blocks, determine a redundancy level of the data object in the P2P network;
    in response to determining that the redundancy level is below a threshold level, upload at least a subset of the plurality of data blocks derived from the data object to one or more additional target devices of the P2P network.

14. The system of claim 1,
    wherein the first client device is further configured to encrypt the data object before transmitting the data object to the particular redundancy manager device in the second request to upload the data object into the P2P network.

15. The system of claim 1, wherein the particular redundancy manager device is further configured to:
    store at least a portion of a distributed hash table; and
    select the one or more target devices to which to upload the plurality of data blocks using the distributed hash table.

16. The system of claim 1, wherein the first client device is further configured to:
    receive a plurality of additional requests to upload respective additional data objects into the P2P network; and
    transmit each additional data object to a different respective redundancy manager device of the plurality of redundancy manager devices in accordance with a load-balancing methodology.

17. The system of claim 1,
    wherein the particular redundancy manager device implements a web service;
    wherein the first client device is configured to use an interface provided by the web service to transmit the data object to the particular redundancy manager device in the second request to upload the data object into the P2P network.

18. A storage device storing program instructions executable by a first client device of a plurality of client devices to implement:
    the first client device receiving a first request to upload a data object into a peer-to-peer (P2P) network, wherein the data object is a first data object;
    in response to the first request, the first client device identifying a particular redundancy manager device of a plurality of redundancy manager devices as a redundancy manager device designated to upload data objects into the P2P network on behalf of the first client device; and in response to identifying the particular redundancy manager device, the first client device transmitting the data object to the particular redundancy manager device in a second request to upload the data object into the P2P network;

in response to receiving from the first client device the second request to upload the data object into the P2P network, the particular redundancy manager device deriving a plurality of data blocks from the data object, wherein the data object is recoverable from a subset of the plurality of data blocks; and the particular redundancy manager device uploading the plurality of data blocks to one or more target devices of the P2P network on behalf of the first client device, wherein the one or more target devices include at least one device selected from the plurality of client devices and the plurality of redundancy manager devices;

the first client device receiving an additional request to upload a second data object into the P2P network; and in response to receiving user input selecting the second service level from the set of two or more service levels, the first client device deriving a plurality of data blocks from the second data object and uploading the plurality of data blocks derived from the second data object to one or more target devices of the P2P network.

19. The storage device of claim 18, wherein the program instructions are further executable by the first client device to implement:

displaying a user interface enabling a user to select a service level from a set of two or more service levels for uploading data objects from the first client device into the P2P network, including a first service level in which redundancy encoding for data objects is performed at a redundancy manager device, and a second service level in which redundancy encoding for data objects is performed at the first client device; and identifying the particular redundancy manager device and requesting the particular redundancy manager device to upload the data object into the P2P network in response to receiving user input selecting the first service level from the set of two or more service levels.

20. The storage device of claim 18, wherein the program instructions are further executable by the first client device to implement:

the first client device transmitting to the particular redundancy manager device one or more redundancy parameters to be used by the particular redundancy manager device in deriving a plurality of data blocks from the data object.

21. A computer-implemented method comprising:

a first client device of a plurality of client devices receiving a first request to upload a data object into a peer-to-peer (P2P) network;

in response to the first request, the first client device identifying a particular redundancy manager device of a plurality of redundancy manager devices as a redundancy manager device designated to upload data objects into the P2P network on behalf of the first client device;

in response to identifying the particular redundancy manager device, the first client device transmitting the data object to the particular redundancy manager device in a second request to upload the data object into the P2P network;

in response to receiving from the first client device the second request to upload the data object into the P2P network, the particular redundancy manager device deriving a plurality of data blocks from the data object, wherein the data object is recoverable from a subset of the plurality of data blocks; and the particular redundancy manager device uploading the plurality of data blocks to one or more target devices of the P2P network on behalf of the first client device, wherein the one or more target devices include at least one device selected from the plurality of client devices and the plurality of redundancy manager devices.

22. The computer-implemented method of claim 21, further comprising:

the first client device displaying a user interface enabling a user to select a service level from a set of two or more service levels for uploading data objects from the first client device into the P2P network, including a first service level in which redundancy encoding for data objects is performed at a redundancy manager device, and a second service level in which redundancy encoding for data objects is performed at the first client device; and wherein the first client device identifies the particular redundancy manager device and requests the particular redundancy manager device to upload the data object into the P2P network in response to receiving user input selecting the first service level from the set of two or more service levels.

23. The computer-implemented method of claim 22, wherein the data object is a first data object;

wherein the method further comprises:

the first client device receiving an additional request to upload a second data object into the P2P network;

in response to receiving user input selecting the second service level from the set of two or more service levels, the first client device deriving a plurality of data blocks from the second data object and uploading the plurality of data blocks derived from the second data object to one or more target devices of the P2P network.

24. The computer-implemented method of claim 21, further comprising:

the first client device transmitting to the particular redundancy manager device one or more redundancy parameters to be used by the particular redundancy manager device in deriving the plurality of data blocks from the data object.

25. The storage device of claim 19, wherein the program instructions are further executable by the first client device to implement:

displaying a user interface enabling a user to select a service level from a set of two or more service levels for uploading data objects from the first client device into the P2P network, including a first service level in which redundancy encoding for data objects is performed at a redundancy manager device, and a second service level in which redundancy encoding for data objects is performed at the first client device; and identifying the particular redundancy manager device and requesting the particular redundancy manager device to upload the data object into the P2P network in response to receiving user input selecting the first service level from the set of two or more service levels.

* * * * *